UNITED STATES PATENT OFFICE.

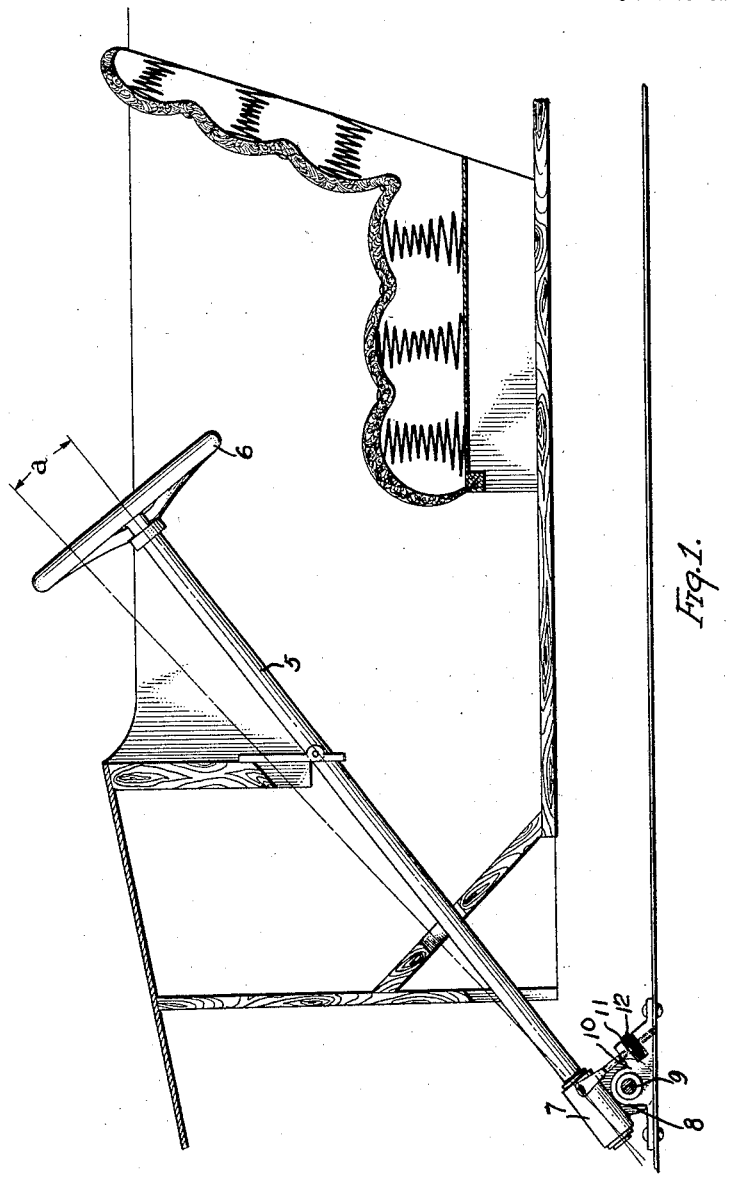

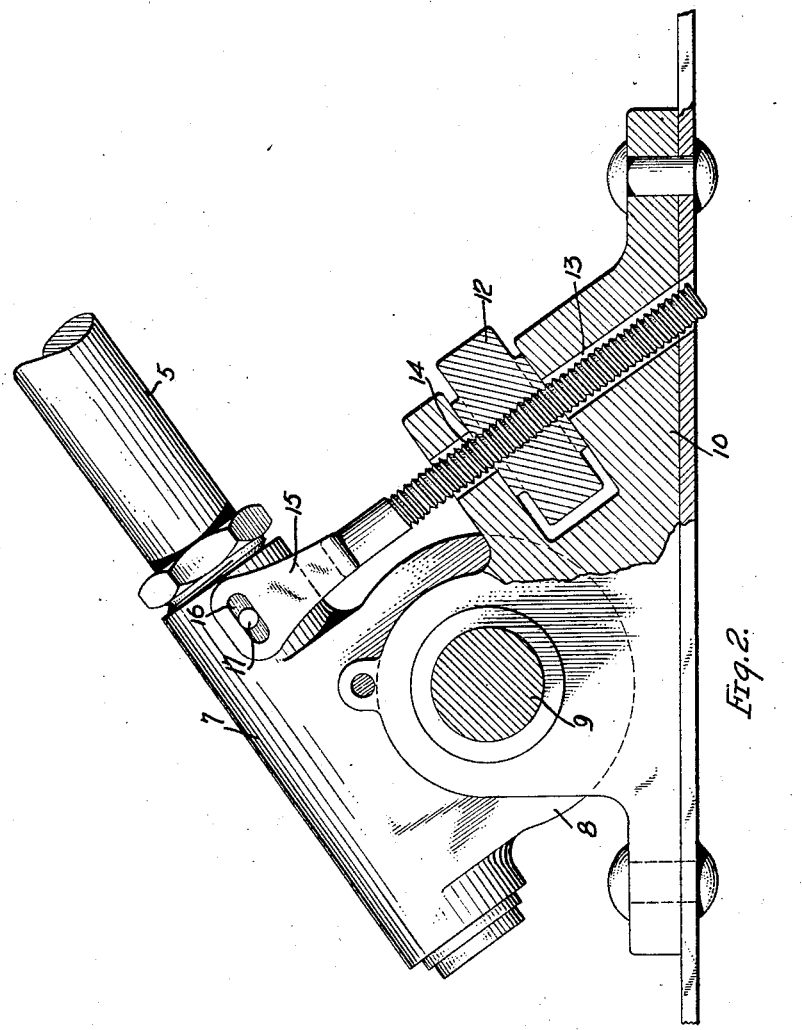

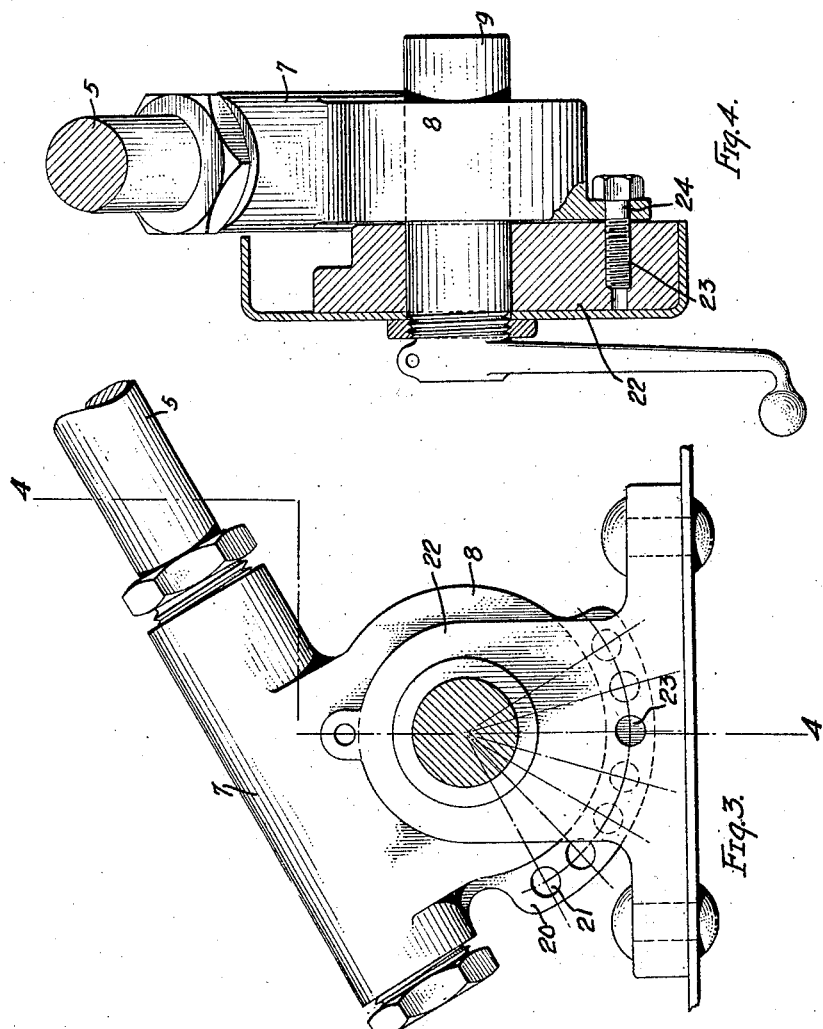

VICTOR W PAGÉ, OF NEW YORK, N. Y.

ADJUSTABLE STEERING WHEEL.

1,402,535.　　　　　Specification of Letters Patent.　　Patented Jan. 3, 1922.

Application filed May 19, 1921. Serial No. 470,987.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Adjustable Steering Wheel, of which the following is a full, clear, and exact description.

The present invention relates to new and useful improvements in motor vehicles, and it pertains more particularly to the steering gear therefor.

It is the primary object of the invention to provide means whereby the steering wheel of a motor vehicle may be angularly disposed with relation to the driver's seat.

It is a still further object of the invention to so construct the mechanism that the steering post is locked and thereby maintained in its adjusted position.

Referring to the drawings—

Figure 1 is a longitudinal sectional view of the forward portion of a motor vehicle body showing a steering column constructed in accordance with the present invention;

Fig. 2 is an enlarged detail sectional view of the steering gear,

Fig. 3 is a detail sectional view of a modified form of the invention, and

Fig. 4 is a detail sectional view taken on the line 4—4 of Fig. 3.

Referring more particularly to the drawings, the reference character 5 designates the steering post and 6 designates the wheel carried thereby. The steering post has secured to its lower end a worm (not shown), and said worm is located within the worm housing 7. This worm housing 7 is carried by a housing 8 and mounted in the housing 8 is a worm gear (not shown), said worm gear being mounted upon a shaft 9, to one end of which is secured the steering arm not shown in the drawing. The shaft 9 is mounted in a bearing or the like 10, and said bearing is notched as at 11. Mounted in the notch 11 of the bearing is a thumb wheel 12, which construction is more clearly shown in Fig. 2. The bearing 10 is further provided with a passageway 13, and mounted in said passageway 13 is a screw-threaded bolt 14. The upper end of this bolt 14 is formed with a yoke 15 and the side members of said yoke are slotted as at 16 and engage pins 17.

The device operates in the following manner: The steering wheel 6 and the post 5 when in the position shown in Fig. 1 are at the lowest point which they are capable of occupying. When it is desired to elevate the steering wheel, the nut 12 is rotated and through the medium of the screw-threaded member 14 having threaded engagement with said nut, the same will be moved longitudinally of the passageway 13 and upon movement of this threaded member, the worm housing 7 and the worm gear housing will be rocked about the shaft 9 until the steering wheel 6 has obtained the desired elevation.

In the form of the invention shown in Figs 3 and 4, the worm gear housing 8 is provided with a flange 20 and said flange 20 is provided with a plurality of spaced openings 21. The bearing member 22 is provided with a single opening 23 and said single opening 23 is adapted to receive a bolt 24 which in turn is passed through one of the openings 21 in the flange 20.

By this construction it is apparent that upon removal of the bolt 24, the worm housing 7 and the worm gear housing 8 may be shifted about the shaft 9 to the desired position after which the bolt 24 is inserted through the single opening 23 and into engagement with the opening 21 in the flange 20 in register therewith, and the parts secured in adjusted position.

From the foregoing it is apparent that the present invention provides means by which the steering wheel of a motor vehicle may be adjusted relatively to the driver's seat, and that said means provides for the securing of the steering wheel in adjusted position against change of adjustment or accidental displacement.

I claim:

1. In a motor vehicle, a steering post, a worm housing, a worm gear housing, means for pivotally mounting said worm housing and said worm gear housing, and means for moving said housings about their pivotal points to vary the angular position of said steering post.

2. In a motor vehicle, a steering column, a steering gear, a housing for the steering gear, a shaft upon which said housing is pivotally mounted, a bearing for the shaft, and means engaging said housing and said bearing for rocking the housing about the shaft to change the angular relation of the steering column.

3. In a motor vehicle, a steering column, a steering gear, a housing for the steering gear, a shaft upon which said housing is pivotally mounted, a bearing for the shaft, and means engaging said housing and said bearing for rocking the housing about the shaft to change the angular relation of the steering column, said last-mentioned means comprising a threaded member carried by the housing and projecting into the bearing.

4. In a motor vehicle, a steering column, a steering gear, a housing for the steering gear, a shaft upon which said housing is pivotally mounted, a bearing for the shaft, means engaging said housing and said bearing for rocking the housing about the shaft to change the angular relation of the steering column, and an internally threaded nut carried by the bearing and adapted to receive said threaded member, whereby said threaded member is operated upon rotation of the internally threaded nut.

VICTOR W. PAGÉ.